May 14, 1946.  R. G. CAMPBELL  2,400,388
AERODYNAMIC BRAKE
Filed March 17, 1944
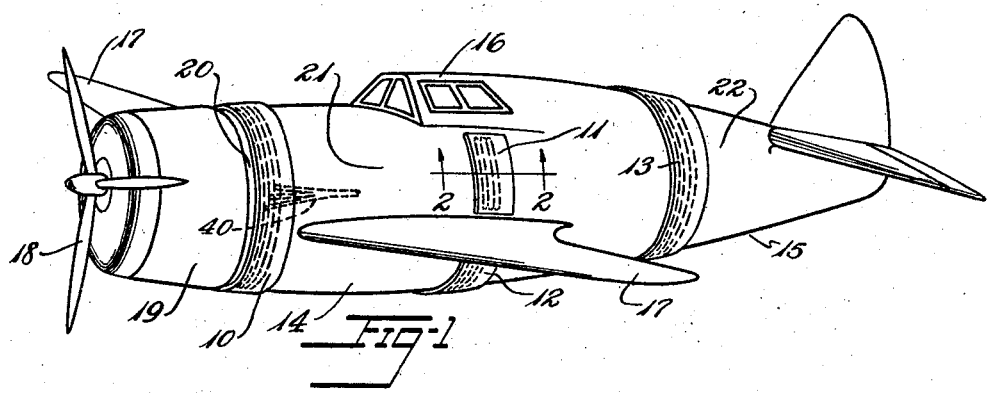
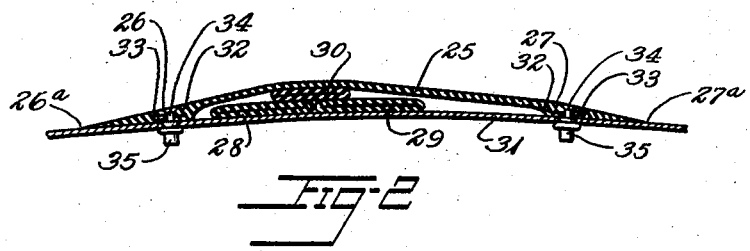
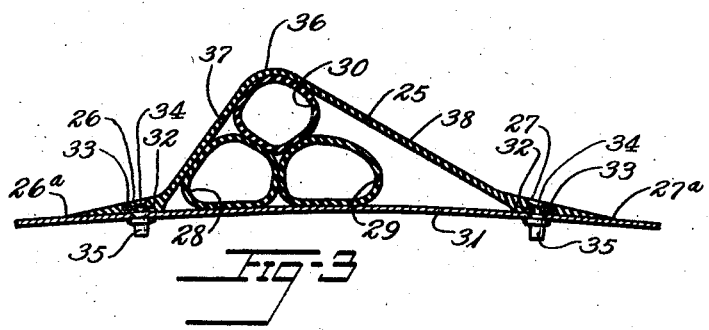
Inventor
Robert G. Campbell
By Willis F. Avery
Atty.

Patented May 14, 1946

2,400,388

UNITED STATES PATENT OFFICE 2,400,388

AERODYNAMIC BRAKE

Robert G. Campbell, Cuyahoga Falls, Ohio, assignor to The B. F. Goodrich Company, New York, N. Y., a corporation of New York Application March 17, 1944, Serial No. 526,865

7 Claims. (Cl. 244—113)

This invention relates to aerodynamic brakes for aircraft and especially to fluid-operated brakes for the purpose.

During the landing descent of gliders and during the diving descent of dive-bomber aircraft, for example, it is desirable that the rate of such descent be decreased to an extent compatible with the requirements of safe flight such, for example, as stability and maneuverability.

Objects of the invention are to provide effectively for increasing the drag of an aircraft while maintaining good stability and maneuverability of the aircraft; to provide for aerodynamically braking the aircraft at its fore and aft plane of symmetry; to provide for such braking transversely around a body between the lateral extremities of the aircraft; to provide for such braking at one or more positions intermediate the length of and around a body between the lateral extremities of the aircraft; to provide effectively for moving the braking element to and from a drag-increasing position by fluid operation; to provide for maintaining minimum drag by the braking means in its retracted condition; and to provide simplicity of construction, convenience of manufacture and installation, and reliability and effectiveness of operation.

A further object is to provide for braking immediately at the vertical plane through the longitudinal axis of the aircraft and symmetrically with respect thereto.

More specific objects are to provide an aerodynamic brake positionable transversely around a body between the lateral extremities of the aircraft and operable by inflatable means; to provide a braking structure positionable about the fore and aft plane of symmetry of an aircraft and to provide such a structure generally triangular in cross-section for presenting an edge to the flow of air when in the drag-increasing position.

These and other objects and advantages of the invention will be apparent from the following description.

In the accompanying drawing which forms a part of this specification and in which like numerals are employed to designate like parts throughout the same, Fig. 1 is a perspective view of aerodynamic brakes mounted on the fuselage of an aircraft and constructed in accordance with and embodying the invention, parts being broken away, Fig. 2 is a sectional view taken along line 2—2 of Fig. 1, parts being broken away, and Fig. 3 is a view like Fig. 2 but showing the brake on the braking position, parts being broken away.

In the illustrative embodiment of the invention shown in the drawing, a plurality of aerodynamic brakes 10, 11, 12 and 13 are mounted on and extend transversely about a body such as a fuselage 14 between the lateral extremities of an aircraft 15, which aircraft also includes an enclosure 16 for the pilot, wings 17, 17 and a propeller assembly 18 rotatively driven by a motor (not shown) housed within a cowling 19 at a nose portion 20 of the fuselage. The brakes are disposed spaced-apart along the length of the fuselage and extend around the body partially or completely and about the fore and aft plane of symmetry of the aircraft, the brake 10 being adjacent the cowling 19 and desirably extending around the nose portion 20 completely, the brakes 11, 12 being at and each extending around a central portion 21 of the fuselage part way at the region of the wings 17, 17 and the brake 13 being at a desired position on a tail or after portion 22 of the fuselage and extending around such portion 22 completely.

Each of the brakes includes an element or covering 25 of resilient rubber or other rubber-like material having attaching margins 26 and 27, the covering 25 overlying a plurality of inflatable tubes 28, 29, 30 having walls of suitable rubber-like material, as shown in Figs. 2 and 3. Such tubes may be disposed adjacent a skin or surface 31 of the fuselage, and desirably with the tube 30 overlying and spanning the adjacent margins of the tubes 28 and 29 in a pyramid arrangement therewith.

The covering 25 is mounted in a condition of stretch between the attaching margins 26, 27 for promoting smooth aerodynamic flow of air across the brake when the latter is in a retracted position as shown especially in Fig. 2, and for promoting the return of the brake from a drag-increasing position, as shown especially in Fig. 3, to such retracted position by virtue of the resiliency of the rubber material of such covering 25. The attaching margins 26, 27 which may taper to relatively thin edges at 26a, 27a for further facilitating smooth airflow across the brake, may include fabric strips 32, 32 folded to accommodate metal beads 33, 33 of flat wire, for example, and such margins may be attached as by screws 34, 34 engaging hollow threaded rivets 35, 35 set into the skin 31.

The superimposed relationship of the plurality of inflatable tubes 28, 29, 30 described hereinabove provides a pyramid arrangement for facilitating obtaining the generally triangular in cross-section brake structure for presenting an edge at 36 to the ambient airstream, when such tubes are inflated and the brake is in the braking or drag-increasing position. Such edge causes turbulent flow of air rearwardly thereof with little or no effect upon the airflow over adjacent portions of the wings 17, 17 thereby promoting stability and maneuverability of the aircraft.

The rubber walls of the tubes 28 and 29 may include expansion-limiting reinforcement of textile fabric of cotton or other suitable material therein, preferably square-woven fabric, straight-laid, such fabric being substantially inextensible and resisting effectively local stretching of the rubber wall. Although the wall of the tube 30 may likewise include such expansion-limiting reinforcement, the wall of the tube 30 may include in the rubber thereof reinforcing material such as stockinette or other knitted or otherwise stretchable fabric, preferably of nylon or rayon, although cotton or other suitable material may be used. The stockinette fabric is stretchable both circumferentially and longitudinally of the tube, which permits extensive stretching of the tube wall for expanding the covering 25 locally for presenting the edge at 36 when the tube 30 is inflated.

For promoting the desired drag through the turbulence of the air-stream adjacent the fuselage 14, the aerodynamic brake is constructed and arranged such that for the drag-increasing position that a front portion 37 and a rearward portion 38 trailing the edge at 36 of the covering 25 are inclined at a relatively steep angle with respect to the skin covering 31 of the fuselage.

While three inflatable tubes 28, 29, 30 are shown for the construction described above, it is to be understood that one or more tubes may be provided and that other suitable arrangements of the plurality of tubes may be utilized than the pyramid arrangement shown in the drawing, for obtaining the triangular cross-section of the brake.

The fabric and rubber parts of the brake are united by vulcanization and heat under pressure.

In the operation of the aerodynamic brake 10, 11, 12 and 13, the inflatable tubes 28, 29, 30 are inflated through suitable connector and conduit means 40 in communication with such tubes, as shown especially in Fig. 1 for the brake 10, which means are connected to a suitable source of air under pressure disposed, for example, in the fuselage 14. When such air is admitted to the tubes in the deflated condition, they progressively alter their form to assume substantially that form as shown in Fig. 3, stretching and expanding the covering 25 to the drag-increasing position thereby presenting an edge at 36 to the ambient airstream and also placing the covering in a condition of greater stretch in the fore and aft and circumferential directions than for the retracted position which increased stretching facilitates returning the brake to the latter position upon deflation of the tubes. The projection of the covering 25 outwardly from the skin 31 of the fuselage and presenting an edge at 36 interrupts the aerodynamic flow of air along such fuselage adjacent the skin 31 and causes turbulent flow of air in the region rearwardly of the brake which increases the drag of the aircraft. Since such disturbance of the airflow is coaxial with the body or fuselage and at the fore and aft plane of symmetry of the aircraft, there is little or no disturbing effect upon the flow of air over the wings 17, 17 and other airfoil structures in the region adjacent the fuselage, which result is advantageous in maintaining the stability and maneuverability of the aircraft.

For a plurality of aerodynamic brakes mounted on the body intermediate the lateral extremities of the aircraft, as shown in the drawing, the respective brakes 10, 11, 12 and 13 may be operated simultaneously, or in positional sequence starting at the nose portion 20, or in any other suitable manner to provide the braking action required for the conditions encountered. One or more brakes may be provided to obtain the desired braking or drag-increasing effect; and for a single brake applied to the aircraft, it may be positioned at the nose portion 20 of the body, which single brake may extend transversely and completely around the nose portion.

When the brakes are mounted at the region of the wings 17, 17, the brake 11 extends between the enclosure 16 and the wings 17, one such brake 11 being disposed at each side of the fuselage. The brake 12 extends transversely part way or wholly across the bottom of such fuselage from wing to wing. The brake 13 like the brake 10, may extend circumferentially and entirely about the tail portion 22.

The hereinabove described brake is also suitable for application to bodies other than the fuselage between the lateral extremities of the aircraft such, for example, as empennage structures, nacelle structures and other related structures of aircraft, and any suitable number and positioning arrangements for a plurality of such brakes may be employed for the particular aircraft application to obtain the desired braking action.

A further advantage of the invention is that in case of failure to operate because of damage to the tubes due to punctures by bullets, for example, the brake will return to or remain in the retracted condition by virtue of the resilience of the rubber material thereby maintaining good aerodynamic flow of air across the retracted brake which makes possible normal operation of the aircraft despite such damage to the brake.

Variations may be made without departing from the scope of the invention as it is defined in the following claims.

I claim:

1. An aircraft comprising an elongated body having an exposed curved circumferential surface stationary with respect to the aircraft as a whole and having an aerodynamic deflector mounted on said surface at a position for axial flow of air rearwardly along said surface and then over said deflector, said deflector comprising an elastic sheet covering extending in surface-conforming curvature in the circumferential direction of said body and having front and rear margins secured to said surface, and means for distending said covering to and from a drag-increasing position by stretching it between said margins and also in the curved circumferential direction to position a portion of the covering intermediate said margins away from said surface in the path of said flow of air, said means comprising an inflatable tubular structure beneath said covering constructed and arranged to distend said covering to a generally triangular shape in cross-section and curved shape circumferentially in said drag-increasing position.

2. An aircraft comprising an elongated body having an exposed curved circumferential surface stationary with respect to the aircraft as a whole and having an aerodynamic brake mounted on said surface at a position for axial flow of air rearwardly along said surface and then over said brake, said brake comprising an elastic sheet covering extending in surface-conforming curvature in the circumferential direction of said body and having front and rear margins secured to said surface, and inflating means for moving said covering by stretching it between said margins and also in the circumferential direction to position a portion of the covering away from said surface, said inflating means comprising a plurality of inflatable tubes beneath said covering at said portion constructed and arranged to distend said covering to a generally triangular shape in cross-section and curved shape circumferentially upon inflation of said tubes and to present a corner of the triangular shape to said flow of air.

3. An aircraft comprising wings, an elongated body between the lateral extremities of the wings having an exposed curved circumferential surface stationary with respect to said wings and having an aerodynamic deflector mounted on said surface at a position for axial flow of air rearwardly along said surface and then over said deflector, said deflector comprising an elastic sheet covering extending in surface-conforming curvature in the circumferential direction of said body and having front and rear margins secured to said surface, said covering having a front portion extending rearwardly from said front margin, and inflatable means between said surface and said covering at said front portion for distending said covering to and from a drag-increasing position by stretching the covering between said margins and also in the circumferential direction to swing said front portion about said front margin away from said surface, said inflatable means supporting said front portion along its extent in the distended condition of said covering to present an inclined relatively flat frontal face to said flow of air and said inflatable means comprising a plurality of inflatable tubes constructed and arranged to distend said covering to a generally triangular shape in cross-section and curved shape circumferentially in said drag-increasing position.

4. An aircraft body having a curved circumferential cowling at the front end thereof and air-deflecting means rearwardly of the front end of said cowling extending in the circumferential direction of said body, said air-deflecting means comprising an elastic sheet covering extending in surface-conforming curvature relative to said cowling in said direction and having a forward attaching margin and a rear attaching margin, and means for distending said covering to an air-deflecting shape by stretching it between said margins and also in the circumferential direction to position a portion of the covering away from said body, said means comprising an inflatable tubular structure beneath said covering constructed and arranged to distend said covering to a generally triangular shape in cross-section and curved shape circumferentially upon inflation of said structure.

5. An aircraft fuselage having an aerodynamic brake mounted thereon at a curved circumferential surface thereof rearwardly of the front end thereof at a position for axial flow of air rearwardly along the surface of said fuselage and then over said brake, said brake comprising an elastic sheet covering extending in surface-conforming curvature in the circumferential direction of said fuselage and having front and rear margins secured to said fuselage, and means for distending said covering to an air-deflecting shape having a frontal face rearwardly and outwardly inclined relative to said surface, the distension being effected by stretching said covering between said margins and also in the circumferential direction to position a portion of the covering away from said fuselage, said means comprising a plurality of inflatable tubes beneath said covering constructed and arranged in superimposed relation to distend said covering to a generally triangular shape in cross-section and curved shape circumferentially upon inflation of said tubes.

6. An aircraft fuselage having an aerodynamic brake mounted thereon rearwardly of the front end thereof at a position for axial flow of air rearwardly along the surface of said fuselage and then over said brake, said brake comprising a covering of resilient rubber-like material having spaced-apart front and rear margins extending in the circumferential direction of said fuselage and secured thereto, and inflatable tubular elements extending in superimposed relation to one another away from said fuselage between said surface and said covering for distending said covering to and from a braking position by stretching the covering between said margins and also in the circumferential direction to position a portion of said covering intermediate said margins away from said fuselage, said tubular elements being constructed and arranged to present said covering as an edge to said flow of air, and said covering being returnable from the braking position with elastic recovery of said material.

7. An aircraft comprising wings, an elongated body between the lateral extremities of the wings having an exposed surface stationary with respect to said wings and having an aerodynamic deflector mounted on said surface at a position for axial flow of air rearwardly along said surface and then over said deflector, said deflector comprising an elastic sheet covering extending in the circumferential direction of said body and having front and rear margins secured to said surface, said covering having a front portion extending rearwardly from said front margin, and inflatable means between said surface and said covering adjacent said front portion for distending said covering to and from a drag-increasing position by stretching the covering between said margins and also in the circumferential direction to swing said front portion about said front margin away from said surface, said inflatable means supporting said front portion along its extent in the distended condition of said covering to present an inclined relatively flat frontal face to said flow of air and said inflatable means comprising a pair of inflatable tubes extending in the circumferential direction of said body in side-by-side relation to one another and an inflatable tube extending in superimposed relation on said pair of tubes and beneath said covering.

ROBERT G. CAMPBELL.